C. H. BEACH.
AGITATOR.
APPLICATION FILED JUNE 11, 1917.
1,291,728.
Patented Jan. 21, 1919.
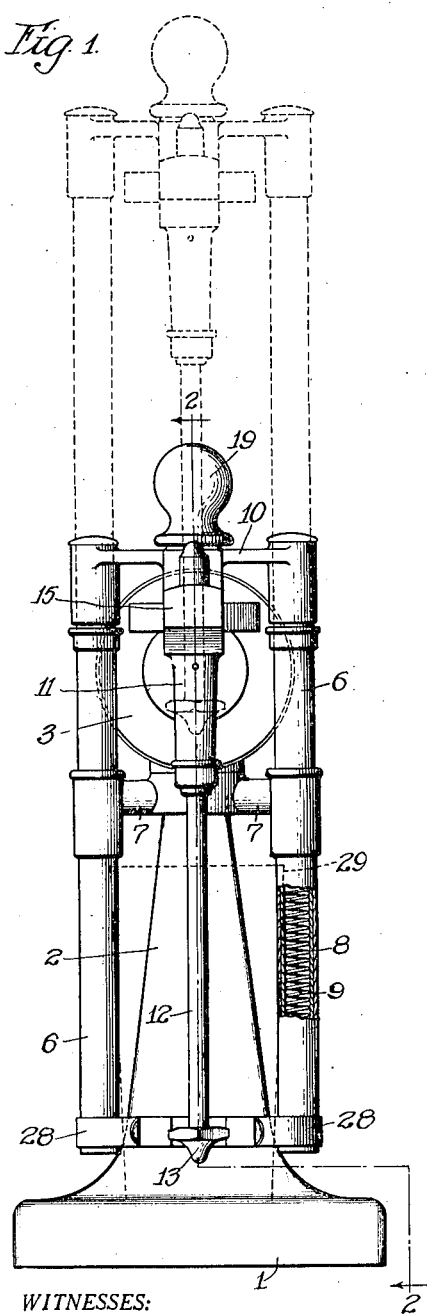
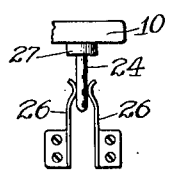
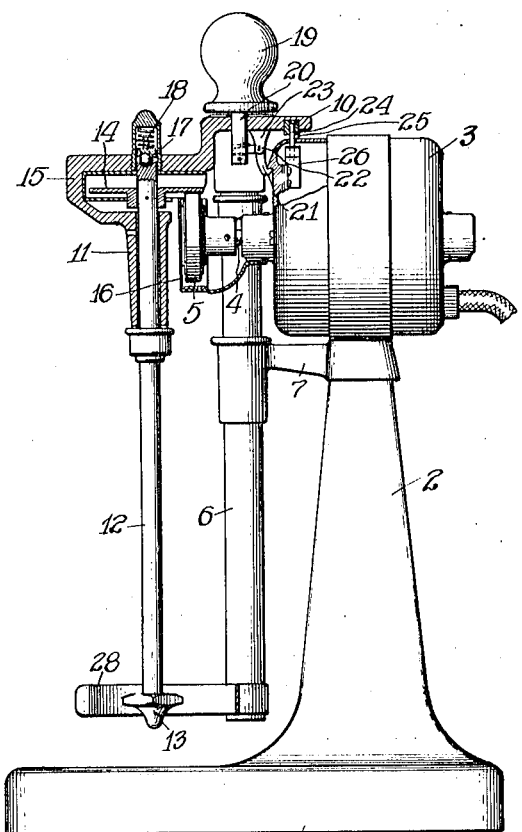
WITNESSES:
INVENTOR.
Chester H. Beach.
BY
George Bayard Jones
ATTORNEY

UNITED STATES PATENT OFFICE.

CHESTER H. BEACH, OF RACINE, WISCONSIN.

AGITATOR.

1,291,728.  Specification of Letters Patent.  Patented Jan. 21, 1919.

Application filed June 11, 1917. Serial No. 173,979.

*To all whom it may concern:*

Be it known that I, CHESTER H. BEACH, a citizen of the United States, residing at Racine, in the county of Racine and State of Wisconsin, have invented a certain new and useful Improvement in Agitators, of which the following is a full, clear, concise, and exact description.

This invention relates to improvements in agitators and more particularly to motor driven agitators of the type adapted to be used for mixing drinks.

In certain types of motor driven drink mixers in extensive use at the present time, the motor is mounted with its shaft disposed vertically, said shaft being elongated to form a spindle, the lower end of which is provided with the usual beater or agitating element which is adapted to be submerged in the contents of a glass or other container and to be revolved therein to thoroughly mix said contents. In these types of devices, either the motor or the spindle is movable vertically to position the beater or agitating element within the container and to withdraw it therefrom, the rotation of the motor shaft being automatically effected upon the lowering of the mechanism and automatically stopped upon the raising of said mechanism.

The primary object of the present invention is to provide a drink mixer wherein the motor is mounted stationary with its shaft disposed in a substantially horizontal plane, and adapted to drive a vertically mounted and movable agitating spindle.

Another object of the invention resides in the provision of manually operable means for causing a yielding engagement of the two friction disks which constitute the driving connection, the manual operation serving also to operate a circuit closing switch and to lock the parts in operative position, until released by a subsequent manual operation.

Other objects and advantages of the invention will be apparent from the following description taken in connection with the accompanying drawings wherein the preferred embodiment of the invention is illustrated.

Figure 1 is a front elevation of the agitator with its parts in operative position, the inoperative position being indicated in dotted lines.

Fig. 2 is a side elevation of the device, parts thereof being shown in section, and Fig. 3 is a detail view of the controlling switch.

Referring to the drawings more in detail, the agitator is shown as comprising a base 1 having mounted thereon an upright standard 2. Mounted on the upper end of said standard 2 is shown a motor 3 which may be of any desired type, said motor being mounted stationary and having its shaft 4 disposed in a substantially horizontal plane, said shaft being provided at one end with a suitable friction pulley 5.

Suitable hollow guides 6 are shown positioned in front of the motor 3 and are mounted on either side of the shaft 4 of said motor in substantially parallel relation. These guides are supported by suitable arms 7 which project forwardly from the base of the motor 3, substantially as shown. The hollow guides 6 are adapted to receive hollow shafts 8 which telescope within said guides and are adapted to reciprocate therein, suitable coiled springs 9 being housed within said hollow shafts 8 and arranged to impel said shafts upwardly and to retain them normally in the position indicated in dotted lines in Fig. 1. These hollow shafts 8 are shown connected by a suitable transverse bar 10 at their upper ends, said bar being provided with a depending portion 11 which supports the agitating spindle 12, the latter being provided at its lower end with the usual beater or agitating element 13.

Keyed to the upper end of the spindle 12 is a friction disk 14 adapted to engage the friction pulley 5 of the motor shaft 4 when the agitating mechanism is forced downwardly against the action of the springs 9 in the manner hereinafter pointed out. The depending portion 11 of the bar 10 is constructed at 15 in such manner as to form a suitable housing for the friction disk 14. A housing 16 is also provided for the friction pulley 5 mounted on the shaft 4 of the motor. This housing 16 is shown supported in position by the adjacent journal bearing of the motor.

The spindle 12 is provided with a suitable anti-friction bearing 17 at its upper end above which is positioned a coiled spring 18 adapted to urge said spindle downwardly in order to effect a firm frictional engagement between the friction disk 14 and the pulley 5 when the agitating mechanism is forced down into its operative position.

Mounted substantially centrally of the bar 10 is a suitable operating knob 19 adapted to be grasped by the operator and pushed downwardly to effect a driving connection between the motor and the spindle. This knob 19 is provided with a suitable plunger 20 which is shown projecting through the bar 10, the lower end of said plunger being adapted to receive one arm of a suitable latch 21 shown in the form of a bell crank lever. The latch 21 is pivoted at 22 to the depending lug 23, the lower end of said latch being hook shaped and adapted to engage a notch formed on the casing on the motor 3, to retain the agitating mechanism in its operative position against the action of the coiled springs 9. It will be noted from this construction that a slight upward pull on the knob 19 will rock the latch 21 to thereby release the mechanism and to allow the same to be elevated to its normal or dotted line position. The engagement of the latch with the notch formed on the motor casing is effected by merely pushing the mechanism down to the position shown in Fig. 2, thereby compressing the spring 18 and insuring a yielding engagement of the friction disks.

The device is also provided with means adapted to render the operation of the motor automatic with the raising and lowering of the agitating mechanism. One form of construction devised to accomplish this result is shown in the drawings and comprises a suitable contact pin 24 depending from the bar 10 and adapted to project through an opening 25 in the motor casing to bridge the space between the spring contacts 26 of the switch to complete the motor circuit. Suitable insulation 27 is provided at the upper end of the pin 24 to prevent short circuiting through the bar 10. From this, it will be noted, that the lowering of the agitating mechanism completes the motor circuit by virtue of the engagement of the pin 24 between the contacts 26 of the switch, said circuit being automatically broken as soon as the latch is raised and the mechanism forced upwardly by the coiled springs 9, said pin being mounted rigidly on the under face of the bar 10 and adapted to be raised and lowered therewith.

Mounted on the ends of the hollow guides 6 are shown suitable spring clips 28 adapted to receive and grip a suitable container 29, the contents of which it is desired to mix.

In the operation of the device, assume the parts to be in their normal position or in the position shown in Fig. 1, and the container placed in position on the base 1, between the spring clips 28. The device is then operated by pushing downwardly on the knob 19, thereby lowering the agitating mechanism and causing the lower part of the spindle 12 to project into the container with its agitating element 13 near the bottom of said container. The device is thereupon automatically locked in the position shown in Fig. 2 and a yielding frictional driving connection between the pulley 5 and the friction disk 14 is effected. The motor circuit is also closed as soon as the agitating mechanism is in the lowermost position, whereby the rotation of the motor shaft is transmitted through the friction pulleys to the spindle 12 to effect a thorough mixing of the contents of the container. When the mixing operation has been completed the knob 19 is pulled upwardly to disengage the latch 21 whereupon the coiled springs 9 act to return the agitating mechanism to its normal position, the motor being automatically stopped by virtue of the disengagement of the pin 24 with the contacts 26 of the switch.

It will be noted from the above that a drink mixer has been provided wherein the driving motor is mounted stationary with its shaft disposed in a substantially horizontal plane, said shaft being provided with means adapted to engage and to impart a rotary motion to a vertically mounted and movable agitating spindle.

Furthermore, means has been provided whereby the operation of the motor is automatic with the raising and lowering of said spindle. It will further be noted that the return of the agitating mechanism to its normal position is automatic with the stopping of the motor when it is desired to discontinue the mixing operation.

It is obvious that various changes and modifications may be made in the construction herein illustrated and the right is therefore reserved to make such changes and modifications as fall within the scope of the appended claims.

Having thus described my invention, what I claim as new and desire to secure by Letters Patent of the United States is:—

1. A drink mixer comprising a base arranged to coöperate with a receptacle, a stationary motor mounted above said base with its shaft arranged substantially horizontally and a vertically mounted spindle movable relatively to said motor and adapted to project into said receptacle and to be driven by said shaft.

2. A drink mixer comprising a standard having means for properly positioning a receptacle, a motor mounted on said standard in an elevated position with its shaft arranged in a substantially horizontal plane and a vertically mounted spindle arranged to project into said receptacle and to be moved relatively to said motor shaft to effect a driving engagement therewith.

3. A drink mixer comprising a standard having means for properly positioning a receptacle, a motor mounted on said standard in an elevated position with its shaft arranged in a substantially horizontal plane, a vertical spindle movable relatively to said motor and supported on said standard by its upper end, and means whereby a rotary motion may be imparted to said spindle by said motor to effect agitation of the contents of said receptacle.

4. A drink mixer comprising a base, a stationary motor mounted thereon with its shaft arranged in a substantially horizontal plane, a plurality of guides mounted above said base, telescoping shafts fitted within said guides, a rotary spindle supported by said shafts and movable therewith, means for effecting a driving engagement between said motor shaft and said spindle, and means adapted to raise said telescoping shafts and said spindle relative to said motor when said driving engagement is disconnected.

5. In a drink mixer the combination with a stationary motor having its drive shaft arranged substantially horizontally, of an agitating spindle mounted on a vertical axis and having a driving connection with said motor shaft and means for automatically raising said spindle relatively to said motor when said driving connection is broken.

6. In a drink mixer the combination with a stationary motor having its drive shaft arranged substantially horizontally, of an agitating spindle mounted on a vertical axis and having a driving connection with said motor shaft, means for automatically raising said spindle relatively to said motor when said driving connection is broken, and means whereby said motor is stopped when said spindle is raised.

7. A drink mixer comprising a motor, shafts movable relatively to said motor, a spindle carried by said shafts, and means whereby the movement of said shafts acts to automatically stop and start said motor.

8. A drink mixer comprising a plurality of shafts, a rotary spindle carried thereby, a motor having a drive shaft extending between said shafts and into driving engagement with said spindle, and means for automatically raising said spindle when said driving engagement is broken.

9. A drink mixer comprising a motor having a drive shaft, a plurality of guides mounted at right angles to said shaft, a support slidably mounted within said guides, a rotary spindle carried thereby, and means for effecting a driving engagement between said spindle and said motor shaft.

10. A drink mixer comprising a motor, a rotary spindle adapted to be driven thereby, a support for said spindle, a switch mounted within the casing of said motor, and means whereby the lowering of said supports effects a driving engagement between said spindle and said motor and cause said switch to be closed.

11. A drink mixer comprising a motor, a rotary spindle adapted to be driven thereby, a support for said spindle, a switch mounted within the casing of said motor, and means carried by said support adapted to project into said casing to close said switch when said support is lowered.

12. A drink mixer comprising a plurality of upright guides, shafts positioned therein, a rotary spindle carried by said shafts, and a motor having its drive shaft extending between said shafts and adapted to drive said spindle.

13. A drink mixer comprising a standard, a motor mounted thereon, a drive shaft, a guide positioned on each side of said shaft, agitating mechanism slidably mounted in said guides, a rotary spindle carried by said mechanism, and means whereby the lowering of said mechanism effects a driving engagement between said spindle and said shaft.

14. A drink mixer comprising a base to support a receptacle, a stationary motor supported by said base with its armature shaft arranged horizontally, a vertically movable spindle, means associated with said base for supporting said spindle and for guiding it in its vertical movement, and driving means associated with said motor and effective to drive said spindle when the latter is in lowermost position.

15. A drink mixer comprising a base, a motor mounted horizontally thereon, a vertical spindle, means carrying said spindle and permitting it to move vertically, a horizontal friction disk turning with said spindle, a vertical friction disk driven by said motor and a yielding connection between said spindle and said means to insure a yielding engagement between said friction disks and to compensate for wear.

16. In a drink mixer the combination with a stationary motor having its drive shaft arranged substantially horizontally, of an agitating spindle mounted on a vertical axis and having a driving connection with said motor shaft and means for raising said spindle relatively to said motor when said driving connection is broken.

17. A drink mixer comprising a motor, a rotary spindle adapted to be driven thereby, a support for said spindle, a switch mounted on said motor, and means carried by said support adapted to close said switch when said support is lowered.

18. A drink mixer comprising driving means including a shaft disposed substantially horizontally, and an agitating spindle mounted on a substantially vertical axis and having a driving connection with said shaft, said spindle being adapted to be moved independently of said driving means to make and break said driving connection.

19. A drink mixer comprising a motor having a drive shaft, a guide, a support slidably mounted on said guide, a rotary spindle carried by said support, and means for effecting a driving engagement between said spindle and said motor shaft.

20. A drink mixer comprising a motor, a shaft movable relatively to said motor, a spindle carried by said shaft and adapted to be driven by said motor, and means whereby the movement of said shaft acts to automatically stop and start said motor.

In witness whereof, I hereunto subscribe my name this first day of June, A. D. 1917.

CHESTER H. BEACH.